INVENTORS
ALFRED Z. KONOPKA
RICHARD O. LIGHTFOOT
BY
ATTORNEY

United States Patent Office 2,914,180
Patented Nov. 24, 1959

2,914,180

FILTER FOR SWIMMING POOLS

Alfred Z. Konopka, Van Nuys, and Richard O. Lightfoot, Los Angeles, Calif., assignors to Paddock Pool Equipment Co., Los Angeles, Calif., a corporation of California Application May 5, 1958, Serial No. 733,109

4 Claims. (Cl. 210—407)

This invention relates to filters for pressure fluid systems, and more particularly to an improved filter which is uniquely designed to facilitate cleaning of the filter element.

Briefly stated, the invention provides a filter equipped with a casing having an inlet through which liquid to be filtered enters the casing, an outlet through which filtered liquid is discharged from the casing, and a filter element through which the liquid flows between the inlet and outlet for effecting removal of solid contaminants from the liquid. During operation of the filter, the solid materials which are filtered out of the liquid tend to accumulate on the surfaces of the filter element. This accumulation restricts flow of liquid through the element, and, therefore, reduces the rate at which liquid may be passed through the filter.

Accordingly, it is necessary to periodically remove the accumulations of solid materials from the filter element. In the past, this cleaning operation necessitated removal of the filter element from the casing of the filter which was a troublesome, time-consuming and unpleasant procedure.

A broad object of the present invention is the provision of a filter of the character described which avoids the above-noted and other deficiencies of existing filters.

A more specific object of the invention is the provision of a filter of the character described which is uniquely designed to facilitate periodic cleaning of the filter element.

Another object of the invention is the provision of a filter of the character described wherein periodic cleaning of the filter element may be accomplished without removal of the element from the filter casing.

Yet another object of the invention is the provision of a filter of the character described, wherein accumulations of solid matter on the interior wall of the casing about the outlet may be removed simultaneously with cleaning of the filter element and without disassembly of the filter.

A further object of the invention is the provision of the filter of the character described which is relatively simple in construction, reliable in operation, and easy to use.

Other objects, advantages and features of the invention will become apparent as the description proceeds.

Briefly, the foregoing objects are achieved by the provision of a filter wherein the filter element has an outlet extension which is removably coupled to the outlet of the filter casing, so that normally, liquid flow occurs through the permeable walls of the filter element to the interior of the latter and thence through the outlet extension of the filter to the outlet of the casing. A handle located exteriorly of the filter casing and connected to the filter element is provided for disconnecting the element from the filter casing and reciprocating the element to loosen accumulated solid matter thereon.

Uncoupling of the outlet extension of the filter element from the outlet of the filter casing permits liquid entering the casing to bypass the filter element and flow directly to the outlet of the filter casing. This flow of liquid occurs over the exterior of the filter element and carries away the loosened solid matter. Scraping elements may also be provided on the filter element for removing deposits of solid matter which are prone to accumulate on the interior wall of the filter casing.

It will become readily apparent as the description proceeds that the improved filter of this invention has general utility and is capable of use in a wide variety of fluid pressure systems. For sake of illustration, the invention will be described with reference to one typical use of the filter, namely, in the filter system of a swimming pool.

The invention may be best understood from the following detailed description thereof, taken in connection with the annexed drawings, wherein.

Figure 1:
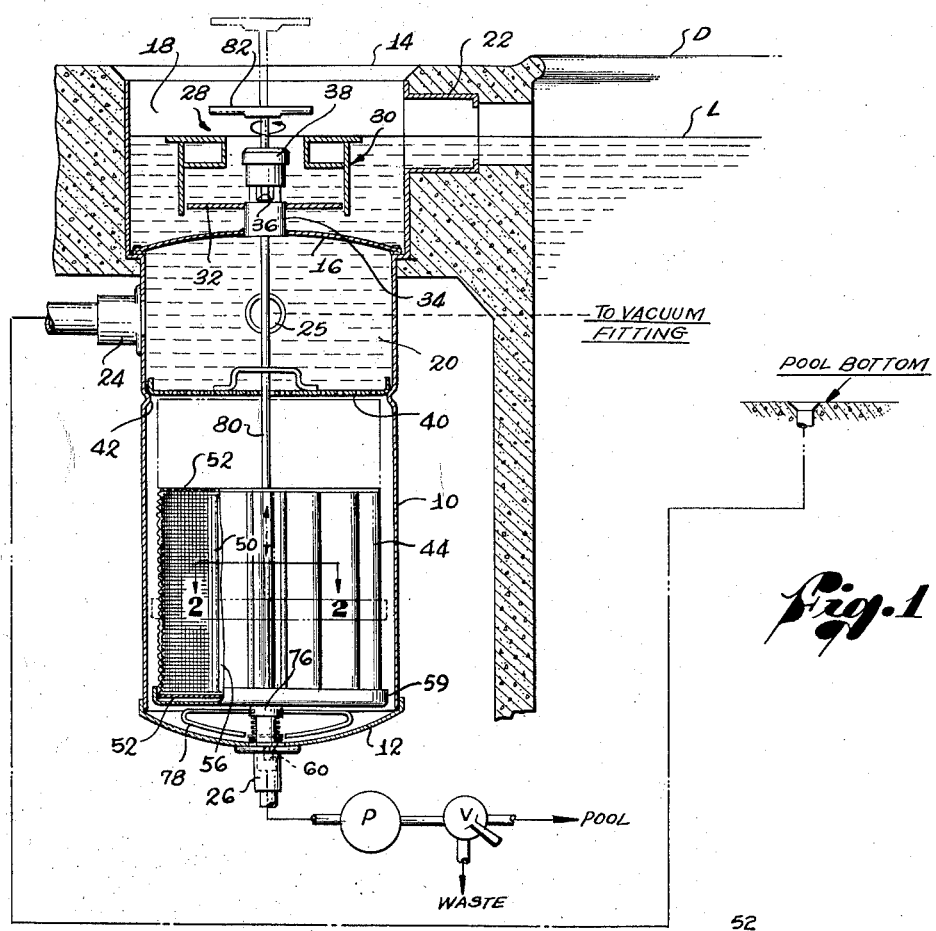
Fig. 1 is a longitudinal section through a swimming pool filter embodying the invention, and illustrates the filter element of the filter in its normal operative position.

Referring now to these drawings, the illustrative swimming pool filter will be seen to comprise a normally vertical, generally cylindrical casing 10, the normally lower end of which is closed by an integral end wall 12. The upper end of the casing 10 is fitted with a removable cover 14. Extending across the interior of the casing 10, intermediate the ends of the latter, is a fixed partition 16 which separates the casing interior into an upper chamber 18 and a lower chamber 20. The portion of the casing enclosing chamber 20 forms a vertical filter tank having lower and upper end walls 12 and 16, respectively.

Located on the cylindrical wall of the casing 10 adjacent the upper end of the latter, is a first, rectangular inlet 22 which opens into the upper casing chamber 18. Indicated at 24 is a second inlet which opens through the cylindrical wall of the casing 10, into the lower casing chamber 20, below the partition 16. A third tank inlet 25, opening to the chamber 20, is provided for connection to a vacuum fitting (not shown) in the pool side wall.

Rigidly fixed to the lower wall 12 of the casing is a flanged outlet or discharge fitting 26, soon to be more fully described, which provides a water outlet from the casing.

In a typical installation of the illustrated swimming pool filter, the casing 10 is recessed below the deck of the swimming pool, indicated at D in Fig. 1, and the inlet 22 opens through the side wall of the pool, as shown. The casing is so vertically located that the normal level L of the water in the pool is located approximately at the midpoint of the inlet opening 22, as shown. In this typical installation, the second inlet 24 connects to a drain in the bottom of the pool and the outlet 26 of the casing connects to the suction of a pump P. This pump discharges to a valve V which is selectively positionable to return the water to the swimming pool or deliver the water to waste, as indicated.

Briefly, in normal operation of the filter to be hereinafter more fully described, water enters the filter casing 10 through both of the inlets 22 and 24, filtered water being withdrawn from the casing through the outlet 26 by the pump P and returned to the pool through the valve V. During cleaning of the filter, water again enters the filter casing through both of the inlets 22 and 24 but, in this case, the valve V is positioned to discharge water from the filter to waste.

Located in the upper casing chamber 20 is a skimmer 28 of the character disclosed in Patent No. 2,579,304. As described more fully in this patent, the skimmer 28 comprises a buoyant cylinder 30 open at opposite ends and slideably fitted over a disk 32. Disk 32 is fixed to the upper end of a sleeve 34 which is rigidly fixed at its lower end to the partition 16. The interior of the sleeve opens into the lower casing chamber 20.

The upper end of the sleeve 34 is externally threaded and provided with a pair of diametrically opposed ports 36 through which water may flow from the upper casing chamber 18 to the interior of the sleeve 34 and thence through the latter to the lower casing chamber 20. Threaded on the upper end of the sleeve 34 is a cap 38.

The structure comprising the ports 36 and cap 38 forms a valve for regulating flow to the filter tank from the skimmer for the reasons discussed in copending application, Serial No. 733,110, filed May 5, 1958, and entitled Swimming Pool Filter. Suffice it to say here that the cap 38 is adjustable on the sleeve 34 either to adjust the effective area of the ports 36, so as to regulate the rate of flow of water from the upper casing chamber 18 to the lower casing chamber 20, or to completely close the ports 36, so as to seal off the lower casing chamber 20 from the upper casing chamber 18. Insofar as the present invention is concerned, however, the cap 38 may be assumed to be positioned so as to permit free flow of water from the upper casing chamber to the lower casing chamber.

Loosely received within the lower casing chamber 20 is a circular perforate basket or screen 40. This screen is supported around its periphery on an internal, upwardly facing annular shoulder 42 within the filter casing 10, so as to permit upward movement of the screen in the casing. Located between the screen 40 and the lower wall 12 of the filter casing is a filter element 44.

Figure 2:
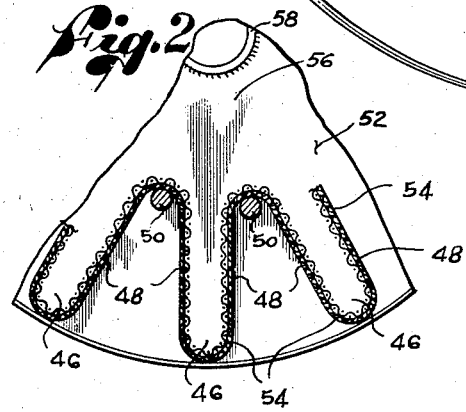
Fig. 2 is an enlarged section taken along line 2—2 of Fig. 1.

Filter element 44 comprises, as shown most clearly in Fig. 2, a series of hollow, radially extending filter sections 46. Each of these filter sections comprises an inner wall 48 of wire mesh which is formed into a flat loop, as shown, and secured at the radial inner edge of the section to a rod 50. The several rods 50 of the several filter sections 46 are secured at opposite ends to a pair of end plates 52 at opposite ends of the filter element. The outer walls 54 of the filter sections comprise a suitable permeable fabric material through which water may flow from the exterior of the filter element to the interior of the several radially extending filter sections 46, and thence to the central passage 56 of the filter element.

Rigid on the lower disk 52 of the filter element and extending axially of the latter is an outlet sleeve 58, the interior of which opens into the central passage 56 of the filter element. Sleeve 58 extends tightly through an end cap 59 fixed to the lower end of the filter element. This sleeve is open at its lower end and has an opening 60 formed in its cylindrical wall.

The lower end of the sleeve 58 is slidably and rotatably receivable in the central discharge passage in fitting 26. Located between the lower end of the sleeve 58 and an internal shoulder 62 in the discharge fitting 26 is a compression spring 64. The spring is compressed when the sleeve 58 is inserted into the discharge fitting so as to urge the filter element 44 in an upward direction.

Rigidly fixed in the cylindrical wall of the sleeve 58 and projecting from the outer surface of the latter is a locking pin 66. This locking pin, in normal operation of the filter, is received in an internal, annular groove 68 in the upper end of the discharge fitting 26. Pin 66 may be released from the groove 68 by rotating the sleeve 58 to align the locking pin 66 with an axial groove 70, opening into the groove 68.

Locking pin 66 and grooves 68 and 70 form a bayonet-type lock for locking the sleeve 58 in its normal lower position, illustrated in Fig. 1, and against the upward force exerted on the sleeve by the spring 64. In this lower position of the sleeve 58, the upper edge of the opening 60 in the sleeve 58 will be observed to be below the upper face of the discharge fitting 26, so as to preclude the flow of water from the lower casing chamber 20 through the opening 60. In order to effectively prevent any leakage of water between the discharge fitting 26 and sleeve 58 through the opening 60, the sleeve 58 is encircled by an O-ring 72 which is pressed into sealing contact with the upper face of the discharge fitting 26 by a spring 74, when the sleeve 58 is locked in the fitting. Other types of sealing means or springs for this purpose may, of course, be used.

Formed about the upper end of the sleeve 58, just below the filter element 44, is an annular shoulder 76 to which are rigidly fixed a plurality of radially extending, wire sludge scrapers 78. Fixed to the filter element 40 and extending axially upwardly through the casing 10, basket 40, inlet sleeve 34 and cap 38 is a rod 80. This rod is freely rotatable and axially movable relative to end wall 16 and screen 40, and mounts an upper handle 82 by means of which the filter element 44 may be rotated and reciprocated, as indicated in Fig. 1.

In normal operation of the filter, the sleeve 58 of the filter element 44 will be locked in its lower position (Fig. 1) in the discharge fittting 26, so that water entering the lower casing chamber 20 through the inlets 22 and 24 is forced to flow through the fabric walls 54 of the several filter sections 46 to the interiors of the filter sections and thence through the central passage 56 of the filter element and sleeve 58 to the filter outlet 26. Solid matter in the water is thereby effectively filter from the water, the filtered water being returned to the pool by the pump P, as previously mentioned. During prolonged operation of the filter, deposits of this solid matter tend to accumulate on the outer surfaces of the filter element 44, as well as on the upper surface of the bottom wall 12 of the filter casing 10. Deposits on the outer surfaces of the filter element 44, of course, impede the flow of water through the filter.

In order to assure proper functioning of the filter, it is necessary to periodically clean the filter element by removing these deposits. Since the deposits on the bottom wall of the filter casing also tend to build up over a period of time, it is necessary to periodically remove these latter deposits.

Figure 3:
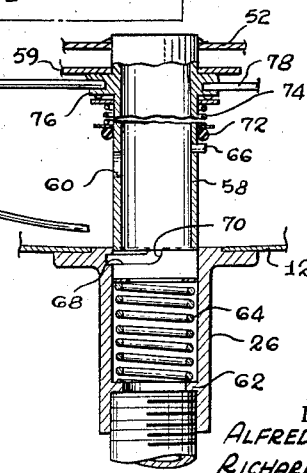
Fig. 3 is a partial view of the filter of Fig. 1 illustrating the filter element as being uncoupled from the filter casing for cleaning purposes.

Cleaning of the filter element 44 and the bottom wall of the filter casing is accomplished as follows. Cover 14 of the filter casing is removed and the filter element is uncoupled from the discharge fitting 26 by turning the filter actuating handle 82. This releases the sleeve 58 for upward movement under the action of a compressed spring 64, to the raised position of Fig. 3, wherein the sleeve opening 60 provides a bypass opening which affords direct communication between the discharge passage in fitting 26 and the lower casing chamber 20. In this raised position of the filter element, accordingly, water entering the filter casing through the inlets 22 and 24 may bypass the filter element 44 and flow directly to the filter discharge through the opening 60.

While the water is thus flowing over the exterior of the filter element 44, the latter is rapidly reciprocated and oscillated by means of handle 82. This reciprocation and oscillation of the filter element in the water within the lower casing chamber 20 tends to loosen the deposits of solid matter. After being separated from the filter element, these deposits are carried with the water flowing over the exterior of the element through the opening 60 and the filter discharge 26 to the pump P whereupon they are discharged to waste.

The filter element is then oscillated by means of handle 82 to effect scraping of the deposits of solid matter from the bottom wall 12 of the casing by the wire scrapers 78. These loosened deposits are also carried to waste.

After the filter element and the bottom wall of the casing have been thus cleaned, the sleeve 58 of the filter element is again locked in its lower position in the discharge fitting 26 to close the bypass opening 60 in the sleeve and thereby effect resumption of the normal filtering operation of the filter.

While a preferred embodiment of the invention has been disclosed for illustrative purposes, it will be apparent that numerous modifications in design, arrangement of parts and instrumentalities are possible within the scope of the following claims.

We claim:

1. In a filter, comprising a normally vertical filter tank including upper and lower end walls, an inlet, and an outlet fitting mounted on said lower end wall, said fitting having a vertical discharge passage opening through said lower end wall, a permeable filter element within said tank including a lower outlet sleeve which is normally slidably inserted in said passage and through which liquid may flow from the interior of said element to said passage, means for sealing said sleeve to said fitting against leakage of liquid from the interior of said tank to said passage when said sleeve is inserted to its normal position in said passage, said sleeve being retractable out of said passage by elevating said filter element to a raised position in the tank, there being a bypass opening affording direct communication between the interior of the tank and said passage in said raised position of the filter element, the improvements comprising a vertical rod fixed at its lower end to said filter element, the upper end of said rod being freely axially movable and rotatable in and extending above said upper end wall, a handle on said upper end of said rod for rotating and vertically moving said filter element in said tank, and rotatably releasable lock means for locking said sleeve in its normal position and releasable by turning of said handle to permit elevating of said element to its raised position and rapid reciprocation and oscillation of the element while in its raised position to wash off the exterior of the element.

2. The subject matter of claim 1 including yieldable means for urging the element toward its raised position.

3. In a filter, comprising a normally vertical filter tank including upper and lower end walls, an inlet, and an outlet fitting mounted on said lower end wall, said fitting having a vertical discharge passage opening through said lower end wall, a permeable filter element within said tank including a lower outlet sleeve which is normally slidably inserted in said passage and through which liquid may flow from the interior of said element to said passage, means for sealing said sleeve to said fitting against leakage of liquid from the interior of said tank to said passage when said sleeve is inserted to its normal position in said passage, said sleeve being retractable out of said passage by elevating said filter element to a raised position in the tank, there being a bypass opening affording direct communication between the interior of the tank and said passage in said raised position of the filter element, the improvements comprising a vertical rod fixed at its lower end to said filter element, the upper end of said rod being freely axially movable and rotatable in and extending above said upper end wall, a handle on the upper end of said rod for rotating and vertically moving said filter element in said tank, and cooperating rotatably releasable lock means on said sleeve and fitting for locking said sleeve in its normal position and releasable by turning of said handle to permit elevating of said element to its raised position and rapid reciprocation and oscillation of the element while in its raised position to wash off the exterior of the element.

4. In a filter, comprising a normally vertical filter tank including upper and lower end walls, an inlet, and an outlet fitting mounted on said lower end wall, said fitting having a vertical discharge passage opening through said lower end wall, a permeable filter element within said tank including a lower outlet sleeve which is normally slidably inserted in said passage and through which liquid may flow from the interior of said element to said passage, means for sealing said sleeve to said fitting against leakage of liquid from the interior of said tank to said passage when said sleeve is inserted to its normal position in said passage, said sleeve being retractable out of said passage by elevating said filter element to a raised position in the tank, there being a bypass opening affording direct communication between the interior of the tank and said passage in said raised position of the filter element, the improvements comprising a vertical rod fixed at its lower end to said filter element, the upper end of said rod being freely axially movable and rotatable in and extending above said upper end wall, a handle on the upper end of said rod for rotating and vertically moving said filter element in said tank, and cooperating bayonet-type releasable lock means on said sleeve and fitting for locking said sleeve in its normal position and releasable by turning of said handle to permit elevating of said element to its raised position and rapid reciprocation and oscillation of the element while in its raised position to wash off the exterior of the element.

References Cited in the file of this patent

UNITED STATES PATENTS

| | | |
|---|---|---|
| 779,346 | Bendix | Jan. 3, 1905 |
| 789,617 | Linke | May 9, 1905 |
| 1,149,926 | Linke | Aug. 10, 1915 |
| 2,588,519 | Guiot | Mar. 11, 1952 |
| 2,692,686 | Fleck et al. | Oct. 26, 1954 |